United States Patent [19]

Ledterman

[11] 4,049,959
[45] Sept. 20, 1977

[54] OVERHEAD BIKE LIGHT

[76] Inventor: Robert S. Ledterman, 6924 Stella Link, Apartment 34, Houston, Tex. 77025

[21] Appl. No.: 610,580

[22] Filed: Sept. 5, 1975

[51] Int. Cl.² .......................... B62J 5/00; F21V 21/08
[52] U.S. Cl. .................................. 240/7.55; 240/52.1; 240/58; 240/81 BD
[58] Field of Search ...................... 240/7.55, 57, 81 C, 240/81 BC, 81 BD, 81 BE, 58, 52.1

[56] References Cited

U.S. PATENT DOCUMENTS

| 1,743,936 | 1/1930 | Segesser | 240/7.55 |
| 2,694,138 | 11/1954 | Schwinn | 240/7.55 |
| 3,696,334 | 10/1972 | Demeter | 240/7.55 X |
| 3,862,410 | 1/1975 | Maxwell | 240/58 X |
| 3,887,900 | 6/1975 | Goedert | 240/7.55 X |

FOREIGN PATENT DOCUMENTS

| 1,055,042 | 10/1953 | France | 240/81 BD |
| 790,347 | 9/1935 | France | 240/58 |

Primary Examiner—L. T. Hix
Assistant Examiner—Wade Brady
Attorney, Agent, or Firm—Head, Johnson & Chafin

[57] ABSTRACT

An overhead lighting apparatus for bicycles, which is removably attached to the frame of the bicycle, and comprises a vertical tubular standard, positioned behind the seat of the bicycle, and rising to an elevation above the head of the rider. The vertical standard carries a forward projection, to which is fastened a lamp holder and lamp, so that when power is supplied to the lamp it will shine down over the head of the bicycle rider and will shine on his shoulders, arms, front and back, so as to make him clearly visible to someone approaching the bicycle from the front and from the back. The forward projection of the standard also carries a small lamp showing an amber or white light to the front and a red light to the back. The conductors carrying power to the lights are carried inside of the tubular standard. The standard is provided with a plurality of hinge joints by means of which it can be quickly folded into a compact space.

3 Claims, 7 Drawing Figures

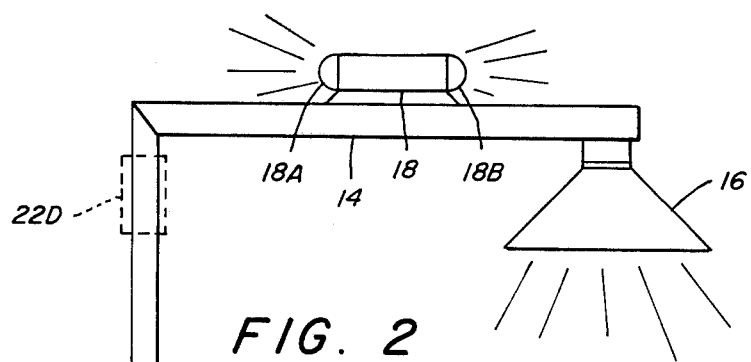
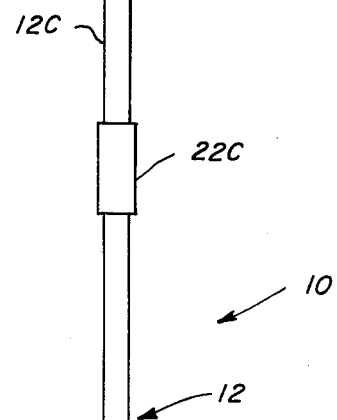
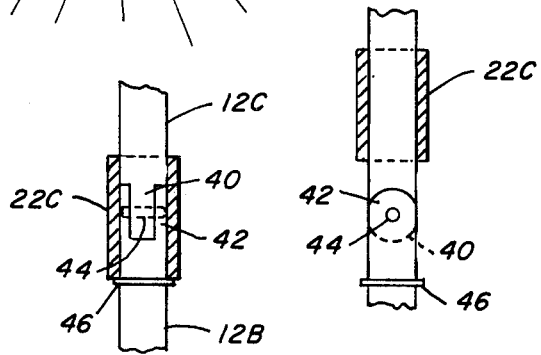
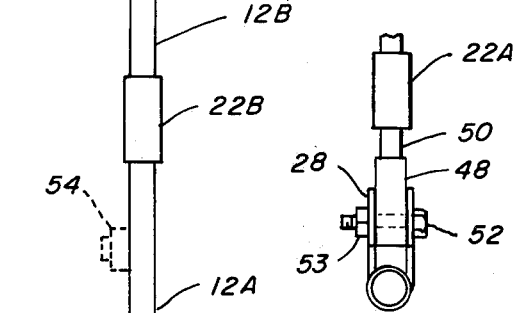
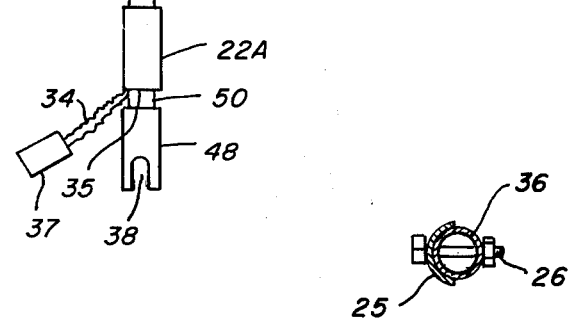
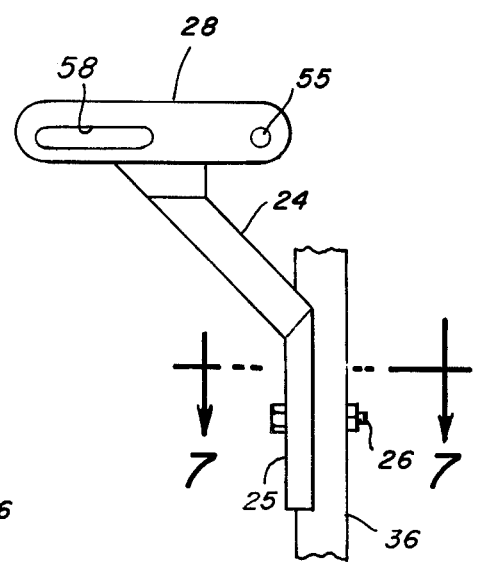

OVERHEAD BIKE LIGHT

BACKGROUND OF THE INVENTION

This invention lies in the field of lights for mounting on bicycles or the like. More particularly, it consists of a standard supporting an overhead light by means of which the rider of a bicycle can be illuminated from the top so that light will fall on his front and back surfaces, shoulders, arms, etc. so as to make the rider fully visible to an approaching vehicle arriving from the front or the back of the bicycle.

In the prior art, there are numerous lamp accessories for bicycles which serve to indicate the presence of the bicycle to approaching vehicles. These may be of various sorts, but primarily are aimed at providing an amber, white or red light, as appropriate, pointed front and back to signal to an approaching vehicle the presence of the bicycle. However, it is more important that the approaching vehicle be able to recognize the bicycle and the rider, and this is done by providing an overhead light which shines down on the rider and the bicycle, to make them visible to an approaching vehicle.

SUMMARY OF THE INVENTION

It is the primary object of this invention to provide a tubular upright standard, attachable with simple means to a bicycle frame, by means of which can be supported, an overhead lamp, which is positioned substantially over the head of the rider, and which shines down on him, and particularly, illuminates the front and back portions of his body to make him visible to the drivers of approaching vehicles.

This and other objects are realized and the limitations of the prior art are overcome in this invention by providing an upright tubular standard which is detachably supported on a bicycle frame, in a position behind the seat of the bicycle, and which carries a forward extension which supports an overhead light fixture, substantially over the position of the head of the rider. This forward extension carries also a pair of lights showing white or amber to the front and red to the rear as in conventional vehicle lighting. The vertical standard is provided with a plurality of hinge joints which can quickly be implemented to permit folding of the standard in such a way as to become a small package, which can be left attached to the bicycle and is out of the way behind the seat of the rider, or can be quickly removed from the bicycle.

BRIEF DESCRIPTION OF THE DRAWINGS

These and other objects and advantages of this invention and a better understanding of the principles and details of the invention would be evident from the following description taken in conjunction with the appended drawings in which:

FIG. 2 represents an elevation view of the apparatus of this invention.

FIGS. 3 and 4 represent two views of the quick change hinge fixtures of the standard.

FIGS. 5, 6 and 7 illustrate several details of the base portion of the invention, indicating the manner of attachment to the bicycle frame.

DESCRIPTION OF THE PREFERRED EMBODIMENT

Figure 1:
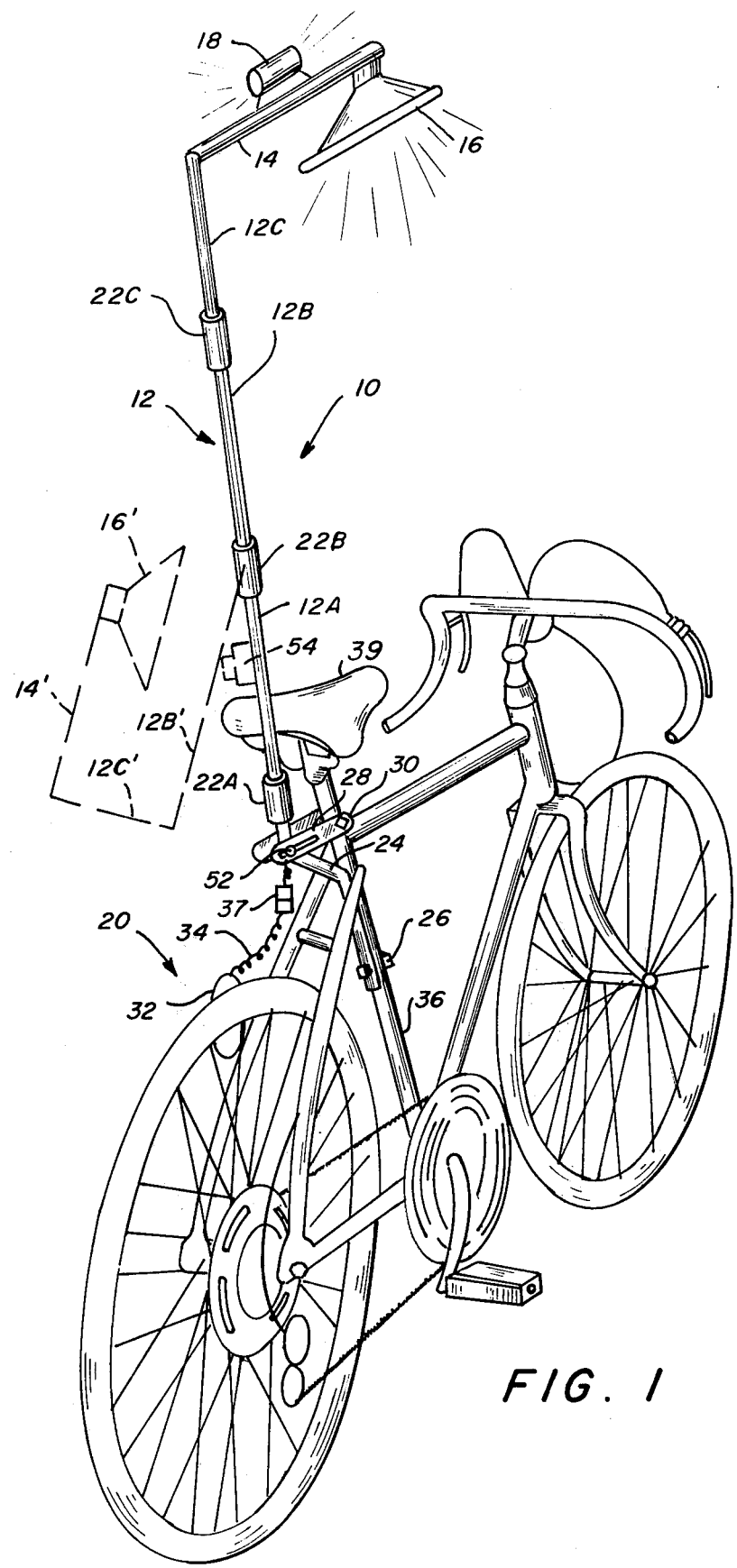
FIG. 1 represents an overall view of a bicycle fitted with the apparatus of this invention.

Referring now to the drawings and in particular to FIG. 1, there is shown an overall view of a bicycle indicated generally by the numeral 20, and the apparatus of this invention indicated generally by the numeral 10. The bicycle light assembly 10 is composed of an upright tubular member 12, which is attached removable to the bicycle frame 36 by means of a bracket 28 which is held to the frame by means of bolts 26 and 30. The standard is supported in the bracket 28 by means of bolt 52 and rises vertically behind the seat 39 of the bicycle. The vertical standard 12 is broken down into a plurality of segments, each made of tubular material of sufficient strength and rigidity for the purpose. These three segments are numbered 12A, 12B, 12C, although there may be more or fewer segments. For example, there may be a hinge, shown in dashed outline 22D close to the junction with arm 14. There is a forward extension 14 of the standard 12 which carries an overhead lamp fixture 16, which is suspended from the forward extension 14, so as to be substantially over the head and shoulders of the rider. The forward extension 14 of the standard can also include a small pair of lights 18 which may show a white or amber light to the front, and a red light to the rear, as is conventional in vehicle lighting. While a horizontal bar 14 is shown as the forward extension it is possible to have other shapes such as an inverted U type, or gooseneck fixture. However, the horizontal bar does provide a lower total height to the standard, while maintaining the lamp fixture 16 at sufficient elevation to be over the head of the rider.

A generator 32 running against the rear wheel can supply power which is carried by wires 34 to the bottom end of the standard. The wires are carried up inside of the standard to the lamps 18 and 16. If desired, a switch 54, shown in dashed line, can be mounted on the standard, or elsewhere on the bicycle, to control the lights. Alternatively, a battery pack (not shown) can be provided as power for the lights. A plug 37 may be used to disconnect the standard from the power supply.

Referring now to FIGS. 2, 3 and 4, an elevation view of the vertical standard 12, the horizontal arm 14, and lamp houses 16 and 18 are shown clearly. There are shown three hinges 22A, 22B and 22C, which break up the vertical standard into three or more parts.

Details of the hinges are shown in FIGS. 3 and 4. One part such as 12C, will have a tongue 40 which fits into a yoke of two uprights 42, attached to the next lower segment 12B. A bolt or pin 44 is provided so that the two segments 12B and 12C can rotate with respect to each other.

A very simple means is provided for locking the hinge joint in a vertical position. That is, to provide a tubular collar 22C which readily slides along the tubes 12B and 12C, etc. There is a ring 46 around the lower member 12B on which the collar 22C normally rests. When the collar is in the position shown in FIG. 3, the joint is stiffened and the segments 12B and 12C are maintained colinear. When it is desired to tilt the two segments with respect to each other, the collar 22C is lifted to the position shown in FIG. 4 and the hinge can be bent at any angle desired.

Referring to FIG. 1 and the dashed outline, it will be clear that the vertical standard can be folded up, so to speak, by hinging the vertical member 12B downward into the position 12B' at the collar 22B. The horizontal arm 14' and lamp 16' fit into the position shown by the dashed outlines. By this means, the standard can be raised to its full height and locked into position very quickly, or equally quickly folded down into a compact package which hangs behind the seat of the bicycle and may be locked into position by simple clamp means not shown.

The lower end of the vertical standard 12 is fitted with a portion 48 having a slot 38, which slot is clamped into the fixture 28, by means of a bolt 52 as shown in FIG. 5. By introducing the electrical wires 34 into the inside of the standard 12 through an opening 35 in the wall of the tubular portion 50, and using a plug 37 on the wires, the vertical standard can be slipped out of the fixture 28 simply by loosening the nut 53 and lifting the portion 48 out of the two sides of the fixture 28.

Fixture 28 has a long slot 58 so that the horizontal position of the standard can be adjusted so as to be positioned behind the seat 36 of the bicycle. The fixture 28 is supported by means of a bolt 30 which fits into the openings 55. The fixture also has a projection 24, 25 which is clamped against the vertical tubular member 36 of the bicycle by means of a bolt 26. This is shown in detail in FIG. 7, which is a cross-section along the plane 7—7 of FIG. 6.

What has been described is a lightweight tubular standard which rises vertically behind the seat of the bicycle, and has a forwardly directed arm which supports an overhead lighting fixture, to shine the light down on the head, shoulders and body of a rider, to make him clearly visible to approaching vehicles. This standard is quickly adjustable and removable from the bicycle and can be quickly folded into a compact package for easy carrying during the daytime when the light is not required, and can be quickly attached to the bicycle at any time when it is needed.

While the invention has been described with a certain degree of particularity, it is manifest that many changes can be made in the details of construction and the arrangement of components. It is understood that the invention is not to be limited to the specific embodiments set forth herein by way of exemplifying the invention, but the invention is to be limited only by the scope of the attached claim or claims, including the full range of equivalency to which each element or step thereof is entitled.

What is claimed is:

1. An overhead lighting apparatus for bicycles, comprising:
   a. a vertical tubular standard, and means for removably attaching said standard to the frame of a bicycle behind the seat thereof;
   b. said standard having a forwardly projecting portion supporting a lamp fixture adapted to throw light downward onto the head and shoulders of the rider;
   c. power means, control means and conductor means passing through the inside of said standard;
   d. means for rapidly and simply inserting and removing said standard from said attaching means;
   e. a plurality of hinge means spaced along said standard, each of said hinge means comprising
      tongue means on one member;
      U shaped yoke means on the other member;
      hinge pin means; and
      tubular collar means slidable along said standard;
   whereby when said collar is positioned at said hinge, said hinge is locked, and when said collar is lifted above said hinge, said members can rotate.

2. The apparatus as in claim 1 including means on the top of said standard for showing appropriately colored lights to front and rear.

3. The apparatus of claim 1 in which said means for inserting and removing said standard comprises an inverted U yoke means on the bottom of said standard adapted to slide into a split fixture and to be locked by bolt means.

* * * * *